(12) United States Patent
Shappell et al.

(10) Patent No.: US 7,567,987 B2
(45) Date of Patent: Jul. 28, 2009

(54) FILE SHARING IN P2P GROUP SHARED SPACES

(75) Inventors: Michael Shappell, Issaquah, WA (US); Ravi T. Rao, Redmond, WA (US); John L. Miller, Woodinville, WA (US); Scott Senkeresty, Duvall, WA (US); Brian Lieuallen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 10/692,501

(22) Filed: Oct. 24, 2003

(65) Prior Publication Data

US 2005/0091289 A1 Apr. 28, 2005

(51) Int. Cl.
*G06F 17/30* (2006.01)
*G06F 12/00* (2006.01)

(52) U.S. Cl. ............... 707/201; 707/10; 709/216
(58) Field of Classification Search ............ 707/1–10, 707/100–104, 200–206
See application file for complete search history.

(56) References Cited

U.S. PATENT DOCUMENTS

| 5,754,306 | A  | * | 5/1998  | Taylor et al. ........... 358/400 |
| 6,009,427 | A  | * | 12/1999 | Wolff .................... 707/10  |
| 6,938,042 | B2 |   | 8/2005  | Aboulhosn et al. ...... 707/10   |
| 6,944,662 | B2 | * | 9/2005  | Devine et al. .......... 709/225 |
| 7,127,613 | B2 | * | 10/2006 | Pabla et al. ........... 713/171 |
| 7,203,753 | B2 | * | 4/2007  | Yeager et al. .......... 709/225 |
| 7,213,047 | B2 | * | 5/2007  | Yeager et al. .......... 709/202 |
| 2002/0052885 | A1 | * | 5/2002 | Levy .................... 707/200 |
| 2002/0097267 | A1 |   | 7/2002 | Dinan et al. |
| 2002/0143989 | A1 |   | 10/2002 | Huitema et al. |
| 2002/0174372 | A1 | * | 11/2002 | Venkataraman ........ 713/400 |
| 2003/0055892 | A1 |   | 3/2003 | Huitema et al. |
| 2004/0103280 | A1 | * | 5/2004 | Balfanz et al. ........ 713/169 |
| 2004/0243672 | A1 | * | 12/2004 | Markki et al. ........ 709/204 |
| 2005/0076098 | A1 | * | 4/2005 | Matsubara et al. ..... 709/219 |

FOREIGN PATENT DOCUMENTS

WO   WO 01/20450 A1   3/2001

OTHER PUBLICATIONS

Window 98, Second Edition, by Paul McFedries, Sep. 1999.*
Bill Pitzer, "Special Edition Using Groove ® 2.0", Jul. 18, 2002, published by Que.*
Smith, Marc A., et al., "The Social Life of Small Graphical Chat Spaces," In *Proceedings of CHI 2000*, The Hague, Netherlands, http://research.microsoft.com/scg/papers/vchatchi2000.pdf (Mar. 2000) pp. 1-8.

(Continued)

*Primary Examiner*—Hosain T Alam
*Assistant Examiner*—Shew-Fen Lin
(74) *Attorney, Agent, or Firm*—Marshall, Gerstein & Borun LLP

(57) ABSTRACT

A computer implemented method and system enable users to share files in a server-less shared space. By providing access to such spaces via a visual presentation, the system renders content available for access by other group members. Access is sometimes provided through propagation of metadata or other uniquely identifying indicia associated with the shared space to all group members.

5 Claims, 20 Drawing Sheets

OTHER PUBLICATIONS

Cheng, Lili, et al., "Hutchworld: Lessons Learned. A Collaborative Project: Fred Hutchsinson Cancer Research Center & Microsoft Research," *In Proceedings of Virtual Worlds Conference 2000*, Paris, France, http://research.microsoft.com/scg/papers/hutchvw2000.pdf, (Jun. 2000) pp. 1-12.

Kollock, Peter, "The Economies of Online Cooperation: Gifts and Public Goods in Cyberspace," *Communities in Cyberspace*, 1998 http://www.sscnet.ucla.edu/soc/faculty/kollock/papers/economies.htm, pp. 1-17.

Kollock, Peter, et al., "Managing The Virtual Commons: Cooperation and Conflict in Computer Communities," *University of California, Los Angeles*, http://research.microsoft.com/scg/papers/KollockCommons.htm (1996) pp. 1-20.

Smith, Marc, et al., "What Do People Do in Virtual Worlds? An Analysis of V-Chat Log File Data," *University of California, Los Angeles*, http://research.microsoft.com/scg/papers/kollockv-chat.pdf (1998) pp. 1-30.

Farnham, Shelly, et al., "Supporting Sociability In A Shared Browser," *In Proceedings of Interact Conference*, Tokyo, Japan, http://research.microsoft.com/scg/papers/sharedbrowsinginteract.pdf (Jul. 2001) pp. 1-8.

Bouvin, "Designing User Interfaces for Collaborative Web-Based Open Hypermedia," *in Proceedings of the Eleventh ACM Conference on Hypertext and Hypermedia*, pp. 230-231 (San Antonio, TX, 2000).

Boyer et al., "Virtual Social Clubs: Meeting Places for the Internet Community," *IEEE International Conference on Multimedia Computing and Systems*, pp. 297-301 (Florence, Italy, Jun. 7-11, 1999).

Cugola et al., "Peer-to-Peer for Collaborative Applications," *in Proceedings of the 22nd International Conference on Distributed Computing Systems Workshops (ICDCS'02)*, pp. 359-364 (Vienna, Austria, Jul. 2-5, 2002).

Dorohonceanu et al., "A Desktop Design for Synchronous Collaboration," *in Proceedings of the Graphics Interface '99 (GI'99)*, pp. 27-35 (Kingston, Ontario, Canada, Jun. 1999).

Duhr, "Oberflächenelemente in interaktiven und kooperativen anwendungen," Universität Oldenburg, Department of Information Systems Thesis (Aug. 2000).

García et al., "Extending a Collaborative Architecture to Support Emotional Awareness," *EBAA '99—Workshop on Emotion-Based Agent Architectures*, pp. 46-52 (May 2, 1999).

Greenberg et al., "Using a Room Metaphor to Ease Transitions in Groupware," University of Calgary, Department of Computer Science, *Research Report 98/611/02*, 31 pages (1998).

Greenberg, "Collaborative Interfaces for the Web," *in Human Factors and Web Development*, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Kindberg, "Mushroom: A Framework for Collaboration and Interaction Across the Internet," *in Proceedings of the Fifth ERCIM Workshop on CSCW and the Web* (St. Augustin, Germany, Feb. 1996).

Lee et al., "Supporting Multi-User, Multi-Applet Workspaces in CBE," *In Proceedings of the ACM 1996 Conference on Computer Supported Cooperative Work*, pp. 344-353 (Cambridge, MA, 1996).

Schmidt et al., "A Generic System for Web-Based Group Interaction," *in Proceedings of the Thirty-First Hawaii International Conference on System Sciences*, Vol. I, pp. 545-554 (Kohala Coast, HI, Jan. 6-9, 1998).

* cited by examiner

FILE SHARING IN P2P GROUP SHARED SPACES

TECHNICAL FIELD

This invention relates to communication and interaction over a computer network. More particularly, the invention is directed to a system and method for defining a server-less shared memory space and sharing files among group members in the shared space.

BACKGROUND OF THE INVENTION

The popularity of the Internet and other networks has caused a migration of various interactions and tasks from the physical world to the digital world. For example, documents and files that would in years past have been shared by sharing physical copies to other members in a group are now often handled electronically and transmitted digitally over a network. In such exchanges between members of a group, it is important to maintain a degree of control over access by various group members, particularly when the group is collaborating with each other.

With the coming of the digital age, the one activity that has not migrated strongly from the physical world to the digital one has been the group interaction. In our daily lives, we interact with people on a regular basis, and form social groups that we engage with on a variety of activities over time. Everyone in the social group knows about every one else, and these groups grow and change over time. This metaphor that exists in our daily lives has not translated into the digital world.

While a number of mechanisms and forums for digital communication between remote parties now exist, none of these has provided a compelling solution that can lead to widespread use. The existing communications mechanisms fail to now provide a user interface that is intuitive and easy to use. For example, these technologies do not provide a true group space within which group members may access shared files and engage in other group activities. Instead, many existing technologies tend to focus on a single activity or endeavor, such as gaming or file sharing, rather than on the group and its activities and communication. Other technologies allow group chatting, but have no true sense of groups, requiring setup of the group each time a group chat is attempted, and providing no mechanism for transitioning the group to an activity other than pure chatting without again manually setting the group up at the next activity.

In short, existing network interaction mechanisms do not provide a mechanism for readily manipulating shared data and information among a desired group of users. In addition, there is no user interface provided by existing mechanisms to simplify management of such shared data.

There thus remains a need to facilitate group interaction through which a desired group of users can interact with each other in a secured environment, and through which users can access, and maintain control with respect to files shared in their shared relationships with one another.

SUMMARY OF THE INVENTION

The present invention is directed to a system and method for sharing files in a server-less, secured shared space that is presented to a user through a graphical interface. In an embodiment, the invention is implemented in a peer-to-peer network environment to facilitate network communications among group members.

A shared space is presented as an entry in the file system such that user selectable management tasks and items may be activated. Such action includes various operations that are performed with respect to shared files within the space. Upon creation of the shared space, other users can access and/or transmit files, and perform other file management operations such as drag and drop shared files, move, copy and other file system management tasks. In addition, shared files and directories may be linked into the shared space. This provides a clear sense of user operations that are available for shared files, to thereby create an ease of use of group spaces.

The invention provides a system and method for sharing files in the shared space. An owner of the shared space can invite other users into the space for the purpose of sharing files such as pictures, video or other content. The shared space itself is secure, such that only individuals invited are able to connect to the space. Once created, users can drag and drop files into the shared space itself as well as perform other file system operations with respect to the shared files and directories. In accordance with the invention, the shared files include associated metadata that is propagated to other members of the shared space. Members who connect to the group later are still able to access such metadata and thereby continue to operate within the shared space. Upon receipt of the metadata, the infrastructure based on user settings can now handle the shared files as desired, such as by copying the shared files locally or not. In the case where a file is to be copied locally, a connection is established with the source of the file metadata, and the shared file is transferred from the source to the local computer. The process is secure in that only a valid member of the group may copy the shared file to its space.

With the use of a file system interface, files within a shared space may be managed quickly and effectively. In this way, other applications can readily access content within the shared spaces defined by the user.

DETAILED DESCRIPTION OF THE INVENTION

Figure 1:
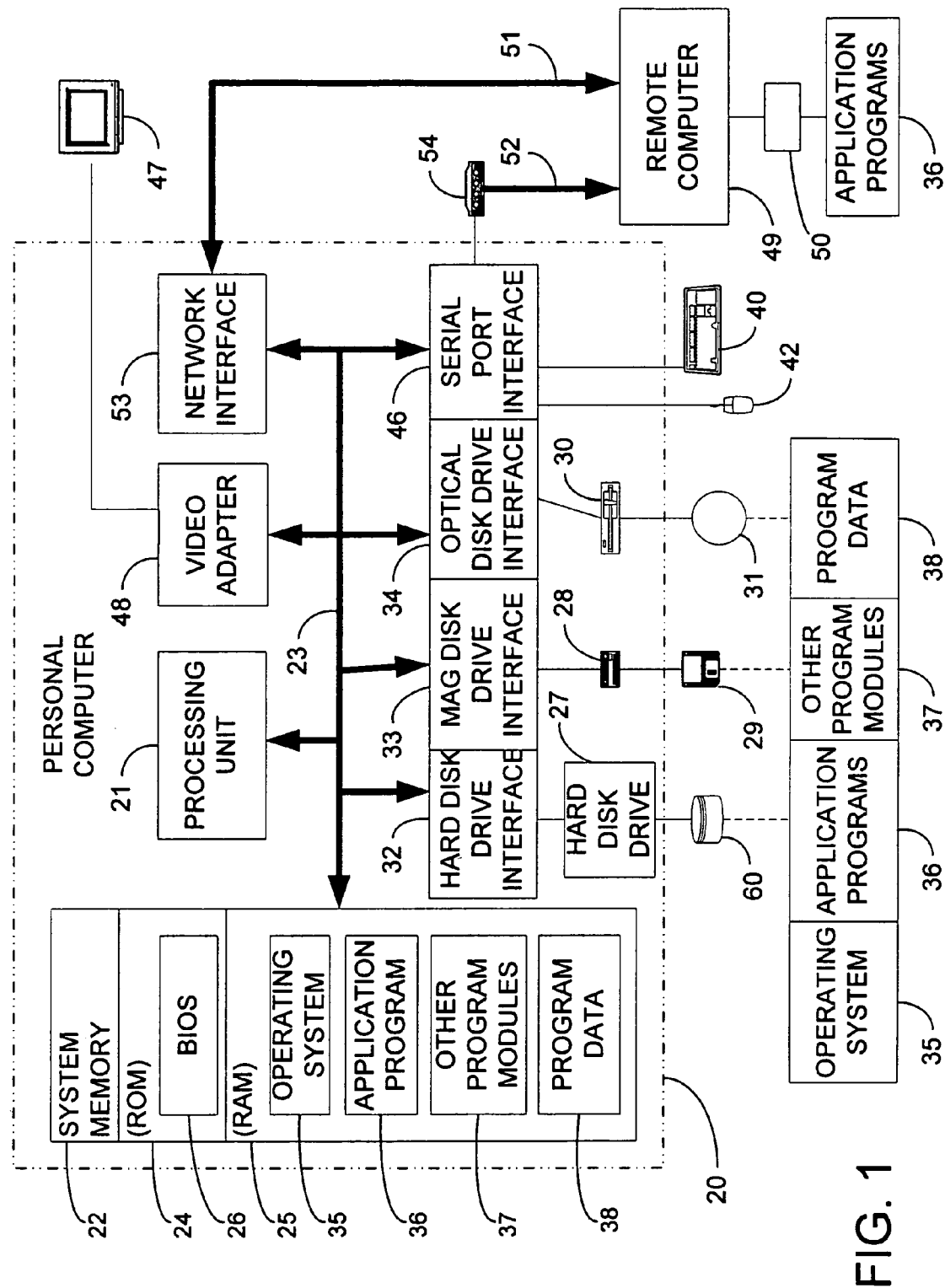
FIG. 1 is a schematic diagram generally illustrating an exemplary computer system usable to implement an embodiment of the invention.

Generally, the present invention relates to a server-less, shared group space that enables secure interactions among defined members in a group. In one aspect, the invention provides a user interface that integrates with file system operations, such as drag-drop operations with respect to files that are placed into the shared space. The invention permits secure relationships to be formed and maintained with one or more other entities by creating a shared space.

Although it is not required for practicing the invention, the invention is described as it is implemented by computer-executable instructions, such as program modules, that are executed by a computing device. Generally, program modules include routines, programs, objects, components, data structures and the like that perform particular tasks or implement particular abstract data types.

The invention may be implemented in various computing device configurations. For example, the invention may be realized in hand-held devices, mobile phones, multi-processor systems, microprocessor-based or programmable consumer electronics, network PCs, minicomputers, mainframe computers and the like, wearable computing or communication devices, and any other device capable of both visual display and direct or indirect communication with another device. The invention may also be practiced in distributed computing environments, where tasks are performed by remote processing devices that are linked through a communications network. In a distributed computing environment, program modules may be located in both local and remote memory storage devices. Thus it will be understood that the invention is preferably incorporated into many types of computing environments as suggested above.

Before describing the invention in greater detail, an exemplary computing environment in which the invention may operate is described in connection with FIG. 1. A computing device 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computing device, such as magnetic cassettes, flash memory cards, digital video disks, Bernoulli cartridges, random access memories, read only memories, and the like may also be used in the exemplary operating environment.

Program modules are stored on the hard disk 60, magnetic disk 29, optical disk 31, ROM 24 or RAM 25, including an operating system 35, one or more applications programs 36, other program modules 37, and program data 38. A user enters commands and information into the device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, the computing device typically includes other peripheral output devices, not shown, such as speakers and printers.

The device 20 is operable in a networked environment using fixed or transient logical connections to one or more remote computing devices, such as a remote computer 49. The remote computer 49 may be another similar computing device, a server, a router, a network PC, a peer device or other common network node, or any other device type such as any of those mentioned elsewhere herein, and typically includes many or all of the elements described above relative to the computing device 20, although there is no such requirement, and only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computing device 20 is connected to the local network 51 through a network interface or adapter 53. When used in a WAN networking environment, the computing device 20 typically includes a modem 54 or other means for establishing communications over the WAN 52. The modem 54, which may be internal or external, is connected to the system bus 23 via the serial port interface 46. Program modules depicted relative to the computing device 20, or portions thereof, may be stored in the remote memory storage device. It will be appreciated that the network connections shown are exemplary and other means of establishing a communications link between the computers may be used. Additionally, the invention is not intended to be limited to a particular network type. Any network type, wired or wireless, fixed or transient, circuit-switched, packet-switched or other network architectures, may be used to implement the present invention.

In the description that follows, the invention will be described with reference to acts and symbolic representations of operations that are performed by one or more computing devices, unless indicated otherwise. Such acts and operations, which are referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures are physical locations of memory with particular properties defined by the format of the data. However, while the invention is being described in the foregoing context, it is not meant to be limiting. Those of skill in the art will appreciate that various of the acts and operations described herein may also be implemented in hardware.

Figure 2:
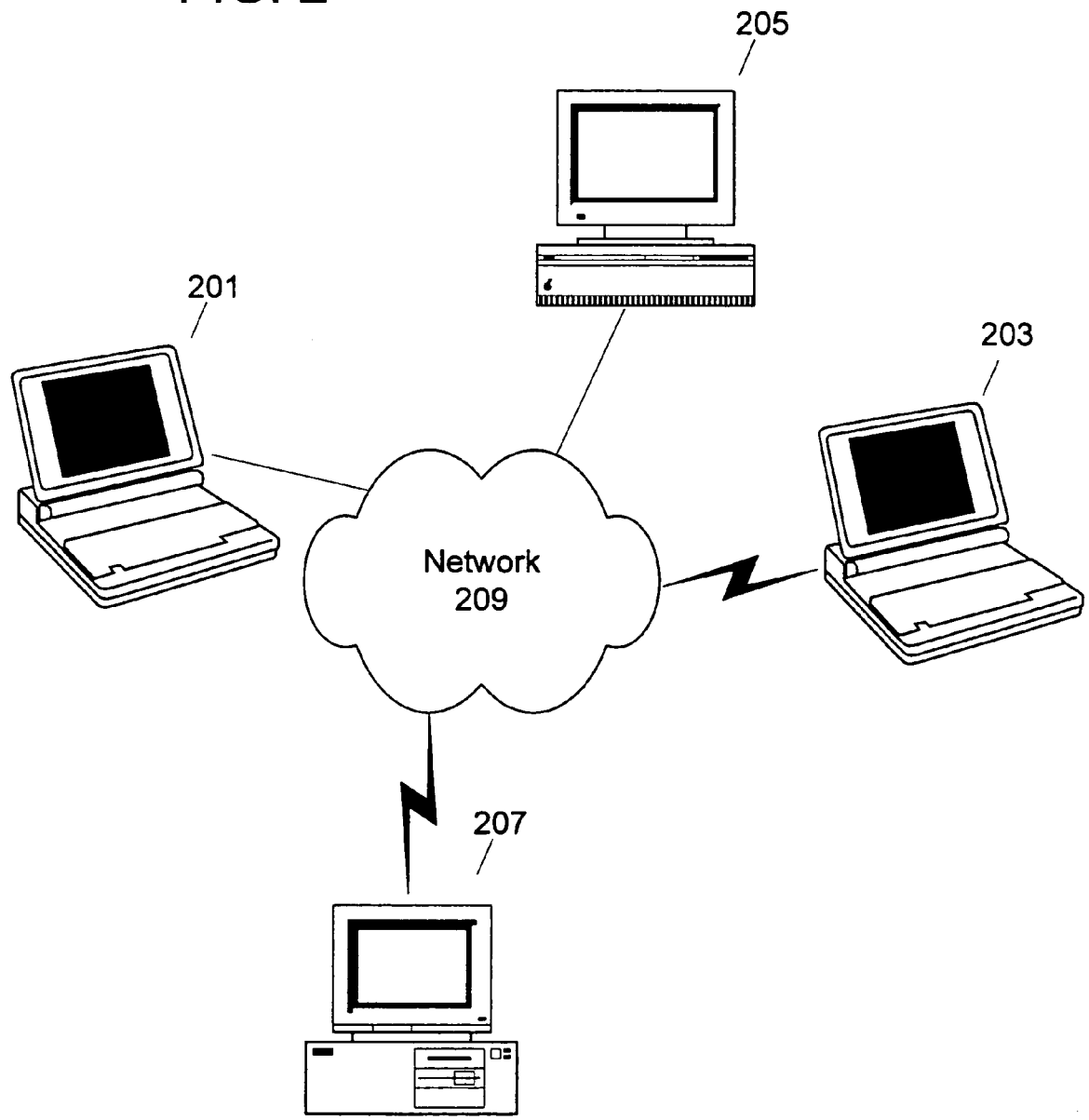
FIG. 2 is a schematic diagram illustrating an exemplary network environment for communications in an embodiment of the invention.

FIG. 2 is a schematic diagram of a network environment within which an embodiment of the invention may be implemented. In particular, a plurality of user computing devices 201, 203, 205, and 207 are illustrated as being communicably linked via a network 209. Each user device will typically be used by or associated with a different user. The exact number of user devices so linked is not important for the present invention, although a network communication will typically involve at least two users. The invention has its greatest benefits when applied to small groups. The number of group members involved for sharing audio files should be limited when necessary to avoid a violation of any copyright pertaining to the shared audio material. Furthermore, while the type of network 209 is not critical, it is preferably a peer-to-peer network that allows an exchange of information, directly or indirectly, between two or more user machines. Via the network 209, a communication from one user may be transmitted to another user or users (via their respective user devices). While the user machines 201, 203, 205, 207 may be geographically remote from one another, the invention is also useful where groups are collaborating, which of course, may occur within a conference room or the like.

One or more user machines used to implement an embodiment of the invention may be as illustrated with respect to the computing device architecture of FIG. 1, although there is no such limitation inherent in the invention. It is contemplated that an implementation of the invention will additionally or alternatively be used with any of a number of other communication device types, including but not limited to wearable communication devices, cell phones, and PDAs.

In accordance with the invention, a shared space is presented through a graphical user interface with the look and feel of existing file system features. For example, the invention may use Windows Explorer-style dialog boxes such as the Open dialog box or the like. Such file system operations are accessible through the created shared space. In one embodiment, the invention is implemented as a namespace extension to Windows Explorer that presents user interface elements in a similar or same manner as a file system would create those elements, such as presenting display windows, icons and other graphic presentations to render the appearance of a file system. For example, the invention may implement namespace extensions and basic folder object interfaces that enable Microsoft Windows Explorer file system capabilities. The application similarly enables various operations that are similar to accepted file system operations to be performed with respect to data residing in the shared space.

Alternatively, the invention may be implemented as a file system driver or filter driver that resides below the file system and accesses file system services provided by an operating system. In this embodiment, the file system displays files that it would typically display including files in the group space so that the file system is extended to file sharing.

In both embodiments, the invention preferably utilizes existing peer-to-peer infrastructure that allows for a large number of applications and/or scenarios to be delivered in a distributed environment. Such infrastructure may provide functionality including, without limitation, NAT traversal, name resolution, efficient multipoint communication, secure groups and distributed data management, as will be appreciated by those skilled in the art.

Figure 3:
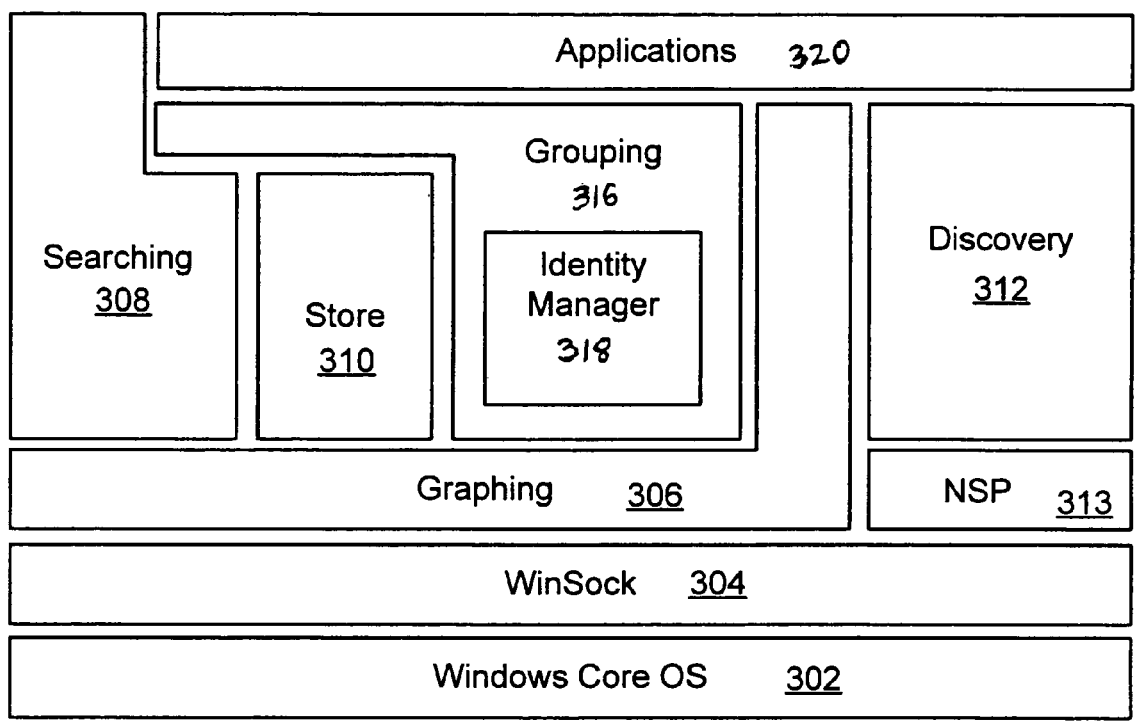
FIG. 3 is a schematic diagram of a peer networking architecture according to one embodiment of the present invention.

For data transmission and communication among group members, a peer networking architecture is preferably utilized. FIG. 3 illustrates a peer networking architecture according to one embodiment of the invention. For performing the various peer-to-peer searching and management operations, the invention utilizes existing infrastructure such as described in patent application Ser. No. 09/942,164, entitled "Peer-to-Peer Name Resolution Protocol (PNRP) and Multilevel Cache for Use Therewith," filed on Aug. 29, 2001 and Ser. No. 09/955,923, entitled "Peer-to-Peer Group Management and Method for Maintaining Peer-to-Peer Graphs," filed on Sep. 19, 2001. The subject matter of these applications is incorporated herein by reference in their entirety. The architecture includes a Core Operating System (OS) layer 302 upon which other layers and components are disposed. For example, a WinSock layer 304 is located above the Core OS layer 302. This layer includes socket extensions that are added to application identifiers in order to facilitate network communication. That is, the WinSock layer is a network application programming interface (API) for Microsoft Windows® that provides a well-defined set of data structures and function calls. In this way, application function calls requesting generic network services are translated into protocol-specific requests.

For performing a search for other peers in the cloud, various components in the architecture may be used as follows. The Discovery layer exposed through the Network Services Protocol component (NSP) 306 provides a means to resolve a name in a distributed, server-less way in a cloud. A Graphing component 306 provides a way of organizing a set of nodes for efficient exchange of information. A Grouping layer 316 provides a security layer on top of the Graphing component 306. Both the Graphing and the Grouping components utilize a Store 310 for an application to publish data to which can be disseminated among all members in the group/graph. An application denoted by the layer 320 can also search for data in the Grouping or the Graphing components by using a Searching component 308.

In accordance with the invention, a group shared space is represented by graphical user interface presentations and controls that are included as part of an existing file system, or at least an intuitive extension of existing file system operations. Much like the real-world, a shared space is created in order to form a relationship among one or more entities. The shared spaces created or used by the same entity are preferably displayed in a single shell folder. Controls for managing the shared spaces and their content are provided as part of a task pane in the shell folder.

Figure 4:
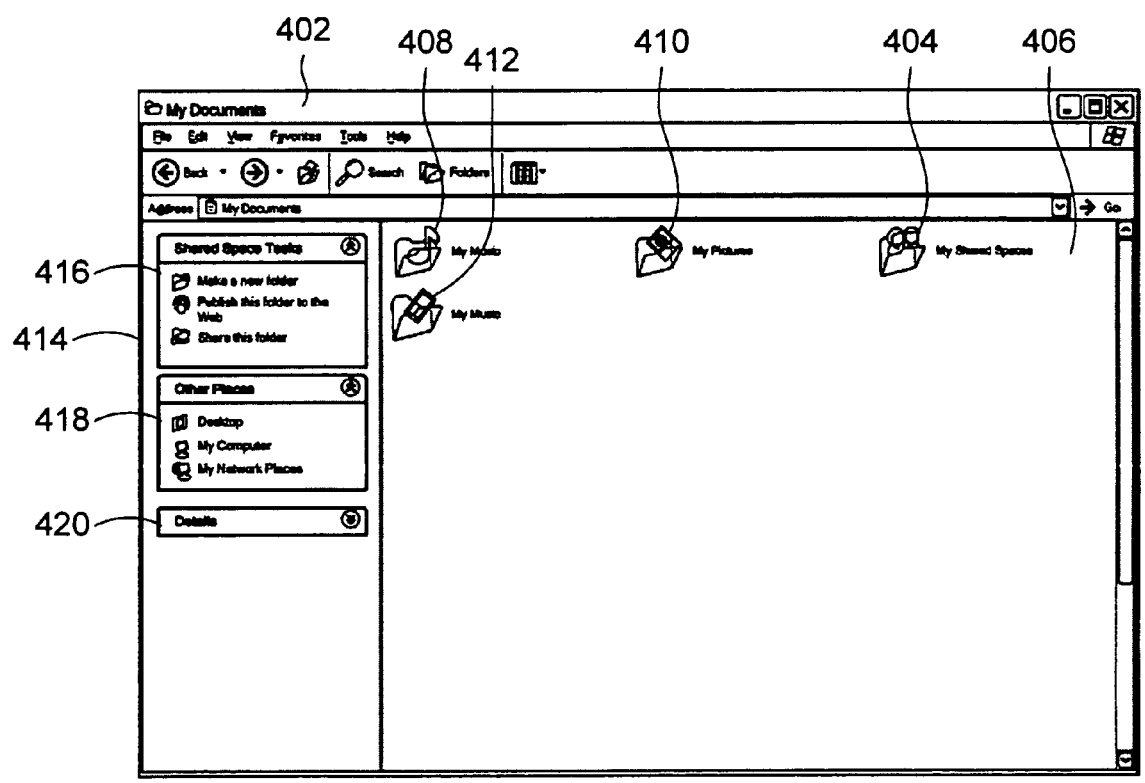
FIG. 4 is a display screen representation showing a number of user interface elements that may be presented to facilitate creation and manipulation of shared group spaces according to an embodiment of the invention.

One overall user interface presentation according to an embodiment of the invention will be described with reference to FIG. 4 before describing individual features in greater detail. A screen display for a "My Documents" folder 402 according to an embodiment of the invention comprises one or more of a number of elements, designed to ease the ability to access, create and manage a group shared space. Preferably, a group space folder object 404, in this case a "My Shared Spaces" subfolder icon, provides a link to a group shared space. As shown, the group space icon 404 is contained within the "My Documents" folder right pane display area 406. Other subfolders are also contained in the "My Documents" folder display area 406 such as a "My Music" subfolder 408, a "My Pictures" subfolder 410 and a "My Videos" subfolder 412. A particular user may have more than one group to which he or she belongs, and that each member of a group may belong to a group or groups to which one or more other members do not belong. Thus, although the relevant group space icon 404 appears to each group member, and appears identically on each machine, there may be portions of a user's screen display that are not shared with other group members.

The My Documents folder 402 also includes a pane 414 in the left-hand display area. This pane 414 includes a task pane 416 that presents various user-selectable File and Folder tasks that may be performed in connection with the shared space. These tasks include making a new shared space folder, publishing a shared space folder to the Internet, and Share this folder with other entities.

In addition to the task pane 416, the left-hand window includes other graphical features including an "Other Places" list 418 that presents links to one or more other file system locations. These include the "Desktop," "My Computer" and "My Network Places," as will be readily recognized by the user. Finally, the pane includes a "Details" list 420 which in this case is a drop-down list for providing details concerning a selected item in the "My Documents" folder.

Figure 5:
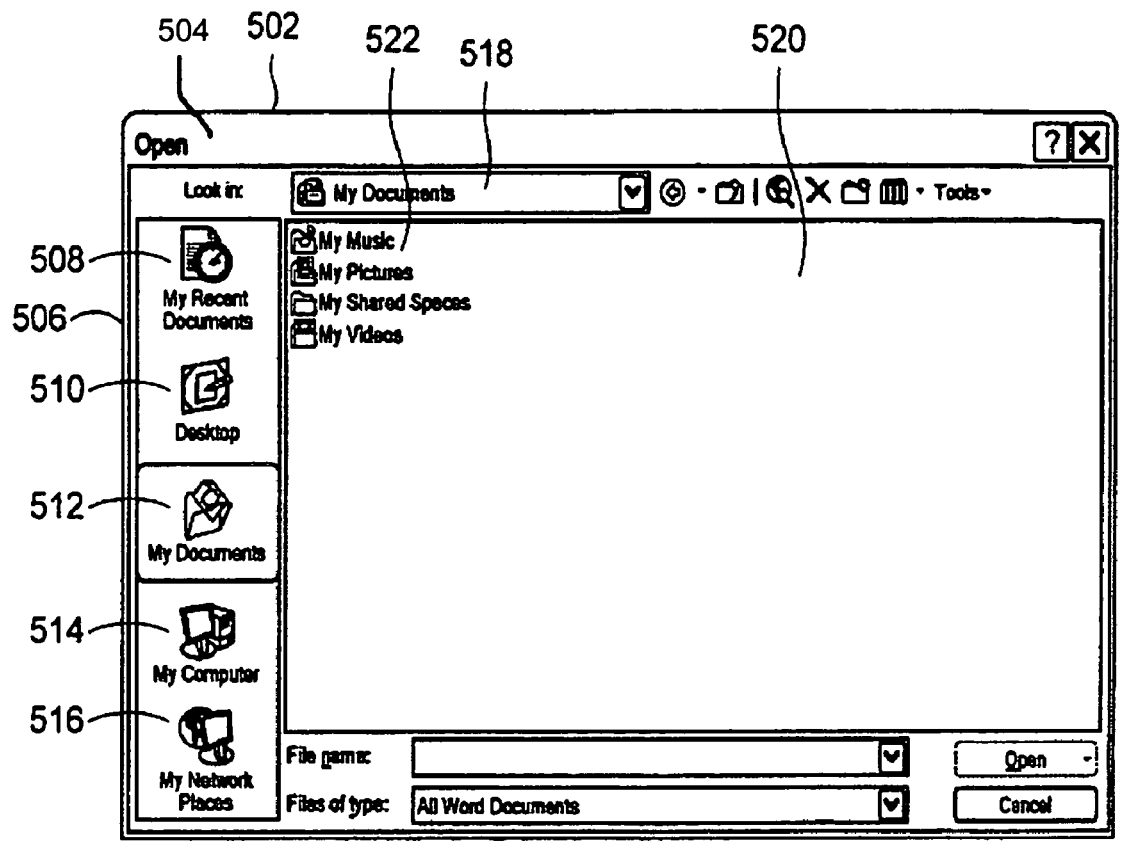
FIG. 5 is display screen representation of another group space user interface element that provides an appearance of a file system folder according to an embodiment of the present invention.

By including the shared space as a link in the "My Documents" folder of the file system, various windows and common dialogs may be used in conjunction with the shared files stored therein. In this way, operations such as open, save, save as, and the like may be performed on such content. One such example is shown in FIG. 5. As indicated in a title bar 502, an Open window 504 is presented. This window includes, in a left-hand pane 506, various iconic shortcuts 508, 510, 512, 514 and 516 that provide links to various locations within the file system. When the "My Documents" shortcut 512 is selected, as is also indicated by the entry in the location field 518, the file system displays a listing of subfolders in a right-hand pane 520. This listing includes the "My Shared Spaces" folder icon 522, which is a link to the shared spaces folder. By selecting this folder through a double click or other suitable user operation, the system will display the contents of the shared space folder.

Figure 6:
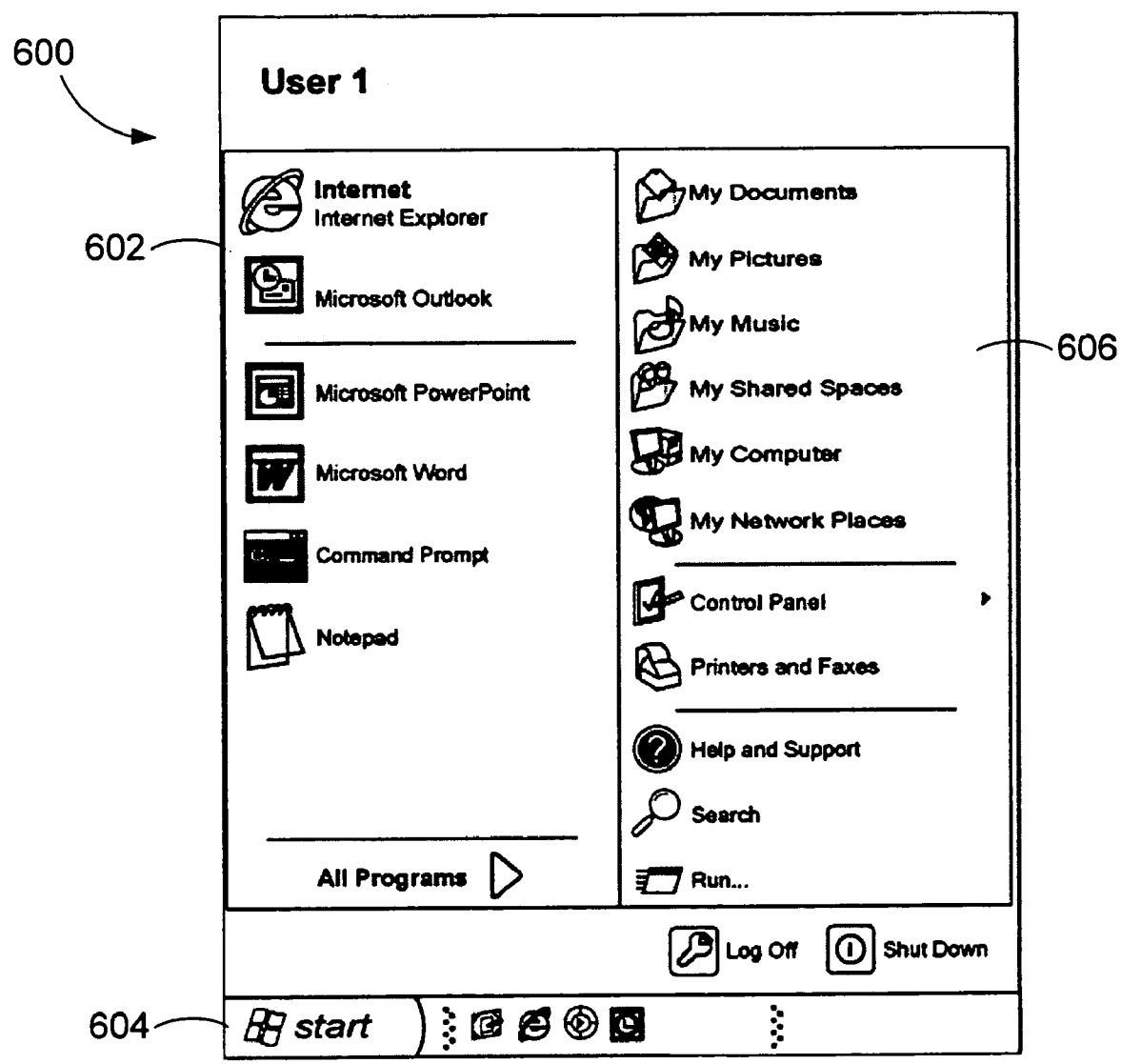
FIG. 6 is display screen representation of a start menu display according to an embodiment of the present invention.

In addition to placement into the "My Documents" folder, a "My Shared Spaces" link may be included within a Start Menu presentation 600, such as the presentation displayed in FIG. 6. The Start Menu 600 includes a listing of links to at least certain applications that may be launched by the system in a first pane 602 of the graphical display. In addition, a task bar tray 604 and controls are provided in a lower graphical display area 604. Finally, a "My Shared Spaces" link is provided as part of a listing on the right hand side of the menu in a display area generally reserved for similar links such as "My Documents," "My Pictures" and "My Music" links. Alternatively, the "My Shared Spaces" link may be included as part of a sub-list such that the user is required to first select the "My Documents" link to access the "My Shared Spaces" folder.

Having described the graphical representation for access to the "My Shared Spaces" window, the manner in which shared spaces themselves are manipulated is now described. In accordance with a feature of an embodiment of the invention, a shared space display window provides a user access to certain tasks in various modes. In a preferred embodiment, the display window provides a specialized task pane permitting access to operations concerning the shared space in three different modes of operation: (1) no shared space item selected; (2) a shared space item selected; and (3) a membership folder selected.

Figure 7:
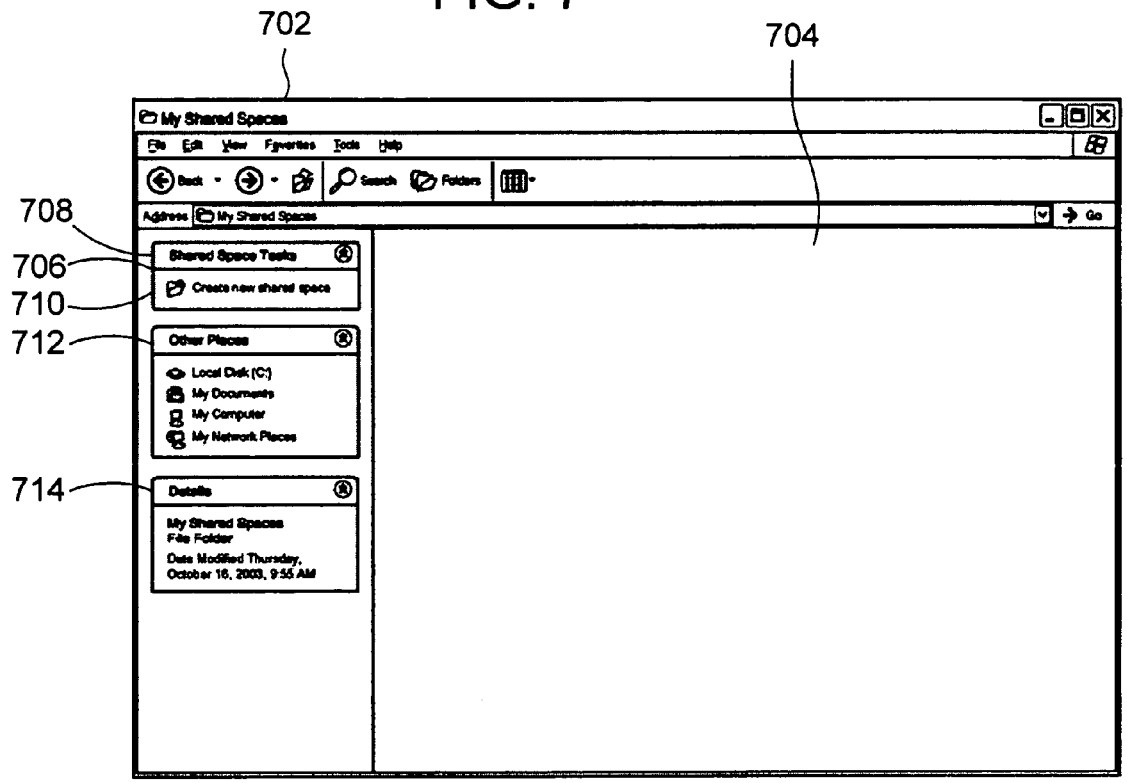
FIG. 7 is display screen representation of a shared space folder according to an embodiment of the present invention.

FIG. 7 is a graphical display shell window 702 for the shared space illustrating a task view when no shared space item is selected. A right hand pane 704 for the window displays all of the shared spaces created or used by the logged in user, if any. In the window shown, no items are present. A left-hand pane 706 displays a specialized task pane 708 that presents selectable menu items for initiating file system operations relating to a shared space. In the illustrated example, when no item is selected, the specialized task pane 708 presents a selectable "Create new shared space" task 710. The user selects this item 710 to create a shared space by naming the space in a data field as defined by the file system. The name is registered and a describable name space icon is created. When added to the group, other members will also see the name.

In addition to the specialized task pane, the left-hand pane 706 may also include an "Other Places" list 712 containing links to other file system locations. Finally, the left-hand pane includes a file or folder detail panel 714 presenting details concerning the shared space file folder.

Figure 8:
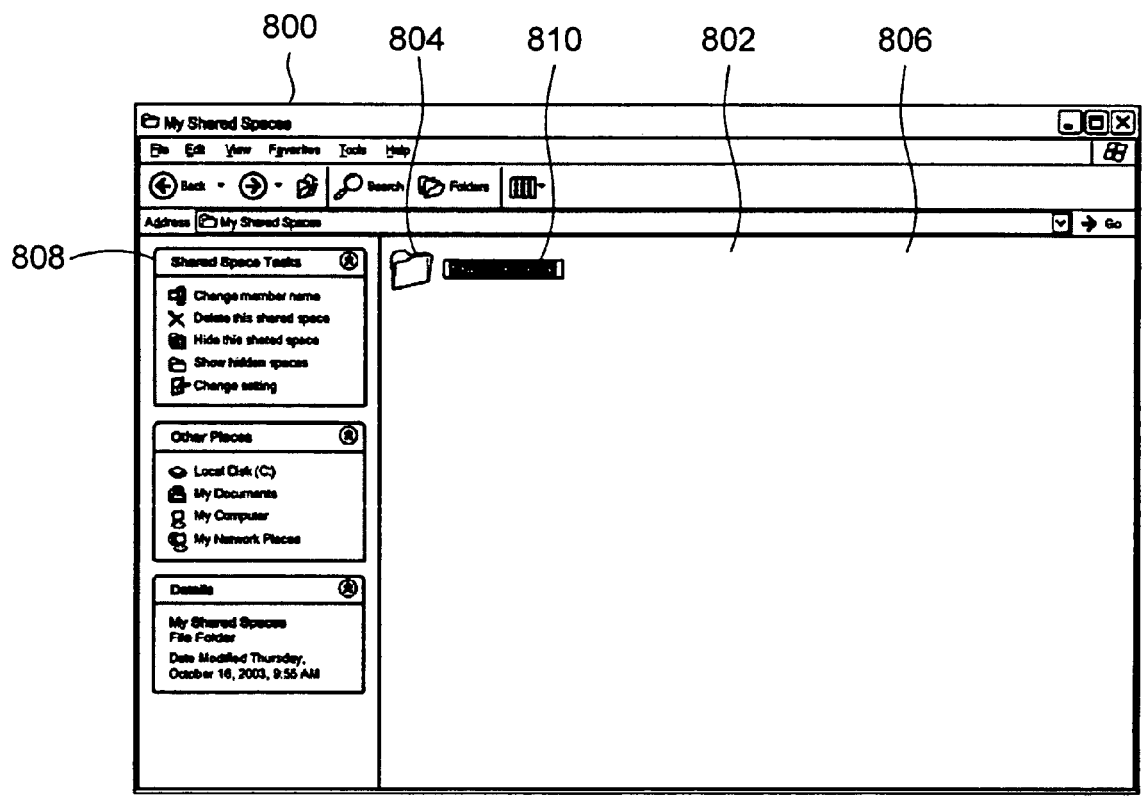
FIG. 8 is a display screen representation of the shared space folder of FIG. 7 upon selection of the folder icon.

When a shared space file folder icon is selected, the specialized task pane changes to present tasks that can be performed by the shared space user. FIG. 8 illustrates the "My Shared Spaces" window 802 in this mode of operation. That is, upon selection by a user of an existing shared space folder such as folder 804 in the right hand pane 806, associated tasks are presented in a specialized task pane 808. FIG. 8 shows selection of a "Rename shared space" task within the task pane. This selection causes a name field 810 associated with the shared space folder 804 to be highlighted. The user interface for renaming a group is thus the same as the interface provided by the file system for editing the names of files and directories. As with conventional file system editing operations, a user may edit the shared space name through use of the highlighted in-place edit field 810. This action will cause the name to change for all other group members of the shared space. In accordance with an embodiment, the owner is the only member having name editing privileges. For other group members, the name cannot be edited.

In addition to the task of renaming an existing shared space, the task pane 808 presents a user selectable "Delete this shared space" task. Selecting this task causes the folder icon to be removed from the "My Shared Spaces" folder and deletes the user as a group member. To connect to the shared space in the future, the user is required to be re-invited by the shared space owner or another group member with sufficient rights to invite a new member into the group. Because the action of deleting a shared space is irreversible, an embodiment of the invention presents a dialog box to notify the user of the impact with a dialog that requires an affirmative response from the user in order to complete the task.

The deletion of a shared space by an owner will impact the group in additional ways. Because the shared space owner is the sole entity that has a private key for the group in a preferred embodiment, its deletion will cause the private key to be lost. This means that group properties such as friendly name and the like can no longer be altered. Because the lifetime of member credentials is effectively infinite, other members may continue to connect to and share information in the group. However, when every group member has deleted the shared space, the group will cease to exist. In addition, unless the group owner has given administrator privileges to another group member, no new members can be invited to join the shared space. For this reason, the user is notified with a dialog that requires an affirmative response in order to complete the task of deleting a shared space.

As an alternative to deleting a shared space, the specialized task pane 808 permits a user to hide a shared with a "Hide this shared space" task. A hidden shared space is not visible unless a user activates a "Show hidden spaces" task. Alternatively, a "Show hidden files" folder option may be enabled. It is noted that a hidden shared space will consume less resources as the shared space database and files transferred from other group members will be removed when the space is hidden. However, data shared by the user will remain available. The user credentials required to access or manage the space will remain on the user's computing system. Using these credentials, the hidden shared space can be reconstructed. For this reason, the "Hide shared space" task is a reversible task such that no dialog is displayed in a preferred embodiment.

Figure 9:
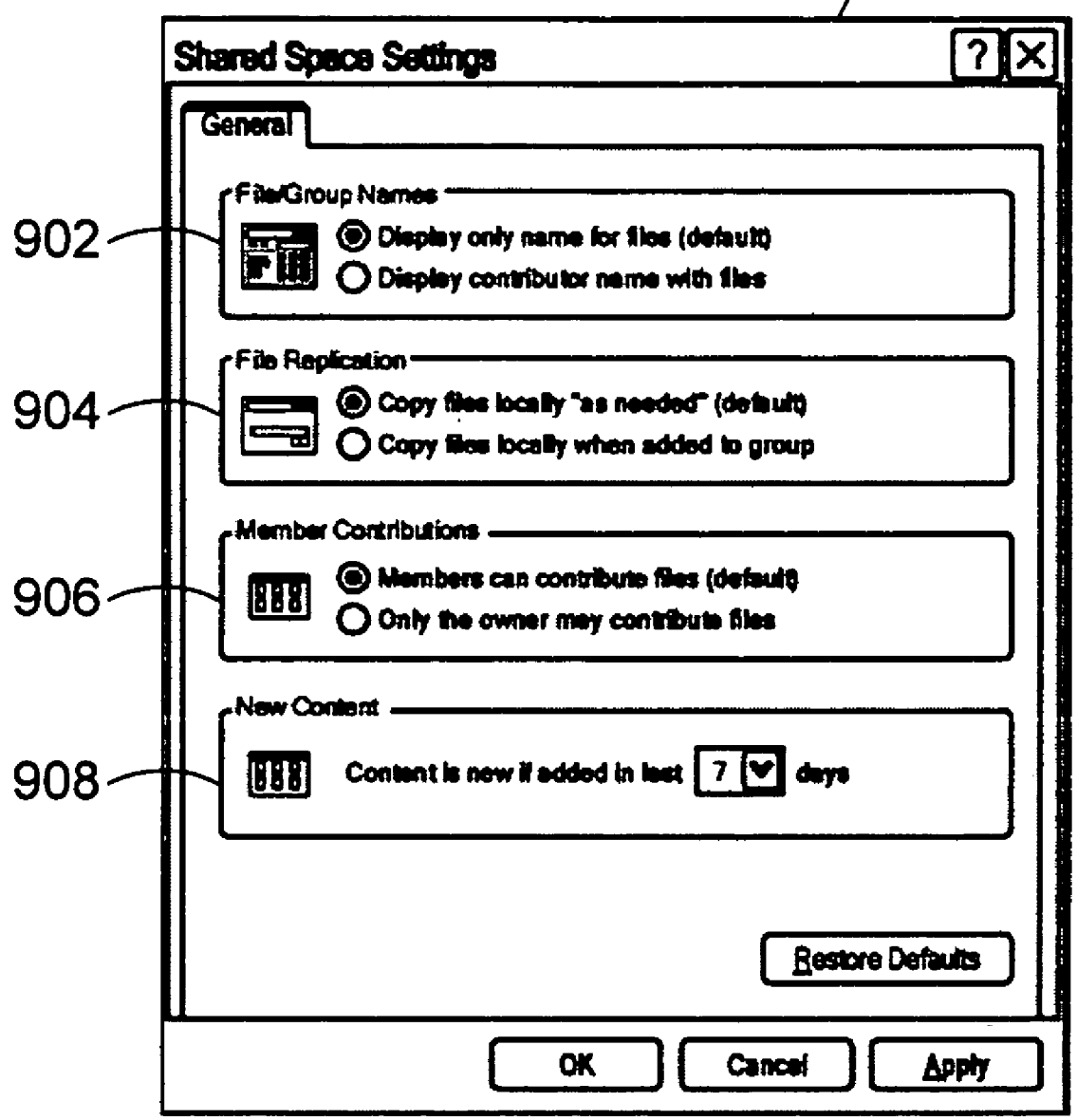
FIG. 9 is a display screen representation of a shared space setting panel to facilitate group management and functionality.

Another user selectable task displayed in the specialized task pane 808 is a "Change setting" task. Selection of this task activates a "Shared Space Settings" dialog, an example of which is illustrated in FIG. 9. As shown, a Shared Space Settings" dialog 900 is a graphical presentation of selectable settings options to permit the user to alter the behavior of a shared space or to restore the behavior of the shared space to default settings.

Unlike a traditional file system, a shared space allows two or more group members to contribute to a file with the same name. To permit the user to differentiate between these files, the user may select an option provided in the Settings dialog 900, shown in FIG. 9 as a File/Group Names option 902. By selecting a "Display contributor name with files" setting, the user may view the contributor name as a part of the filename. In a preferred embodiment, the default setting is a "Display only the name for files" setting.

Another user selectable option relates to a "File Replication" setting 904. Files that are used in the shared space can be copied to the local machine when they are accessed, that is, they can be copied on an on-demand basis through user selection of a "Copy files locally 'as needed'" setting. Alternatively, they may be replicated to the user's computer when they are added to the shared space by selecting a "Copy files locally when added to group" setting. Similarly, a "Member Contribution" setting 906 permits user selection between a "Members can contribute" setting and a "Only the owner may contribute files" setting. Selection of the latter setting makes members of the group read only. When this setting is selected, only the owner may contribute content to the group.

Finally, the Settings dialog includes a "New Content" setting 908 for permitting user selection of what specifies "new" content. This setting 908 includes a drop down list of options such as 1, 7, 14, 30, 60 and 90 days. This field could optionally include an edit field to permit the user to specify any value.

Figure 10:
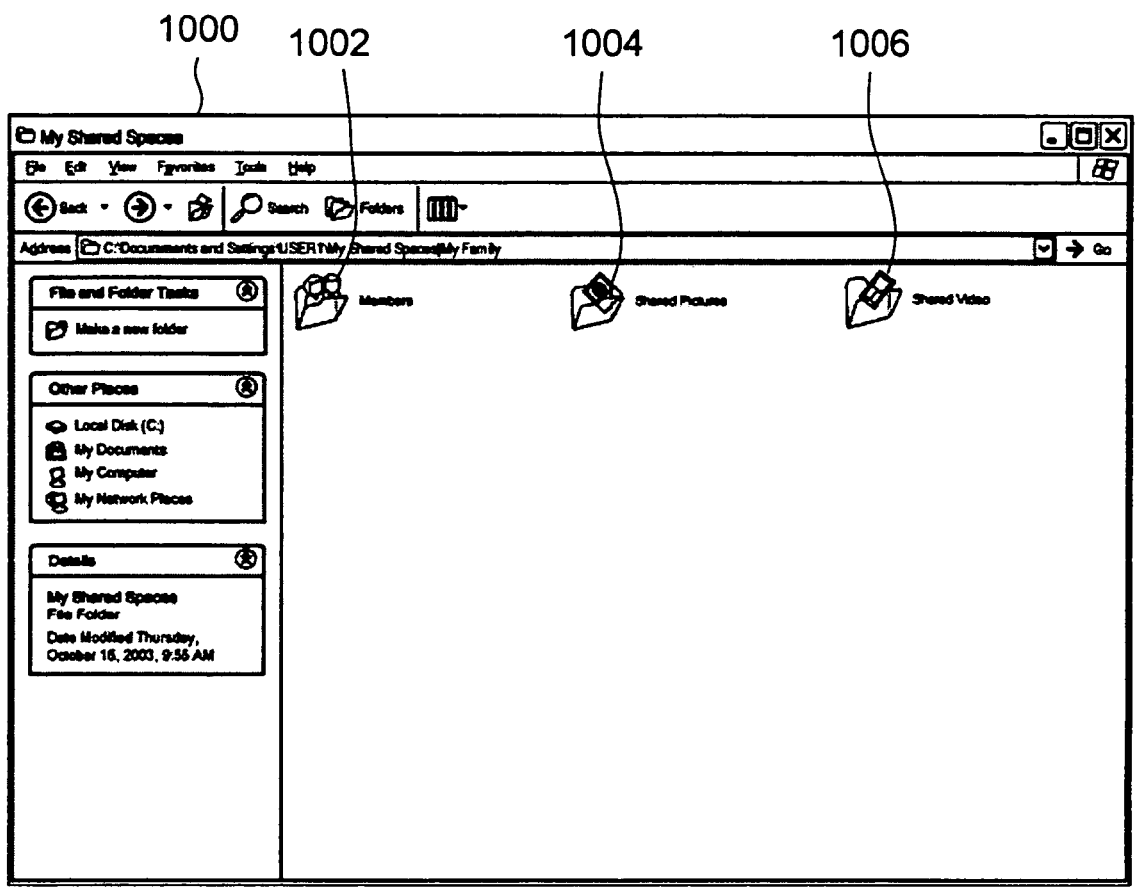
FIG. 10 is a display screen representation of a shared space task view according to an embodiment of the invention.

Having described certain details of the location and settings concerning a shared space folder, a member task view will now be described. FIG. 10 illustrates a member task view for a graphically presented My Shared Spaces folder 1000. As shown, the My Shared Spaces folder includes subfolders including a Members subfolder 1002, a Shared Pictures subfolder 1004, and a Shared Video subfolder 1006 displayed in a right hand pane of the folder 1000. This layout simplifies user manipulation of files that will be added to the shared space, such as by drag and drop operations. That is, the Shared Pictures and the Shared Video subfolders are links to conventional directories that could even be deleted by the group owner if desired.

To become a group member, a user is invited to join the group space with the issuance of an invitation. Invitation can be done using any out of band mechanism. One of the mechanisms that could be used is location specific. For instance, an invitation could be issued to users located in the same conference room; it could be issued to users on the same network; it could be issued to all users participating in a meeting (whether they are local in the conference room or participating remotely). Once the invitation is received by the invited user, he can join the shared space and participate in sharing files.

In accordance with an embodiment of the invention, group members are assigned roles within the group. A group owner is an entity that initially creates the group space. The owner adds members by inviting other entities, as explained below, and assigns roles to such other group members. The roles define the level of access to group members. For example, one such role may be that of an administrator, who may be assigned many of the same rights as the owner, including the right to add or delete other group members. Other roles include member, contributor or other custom roles that are assigned rights and privileges to varying degrees. In addition, group members have "presence," that is, each group member publishes his presence when on-line, as explained below. Finally, group members each preferably have the same view, whenever activity occurs with respect to the group space.

Figure 11:
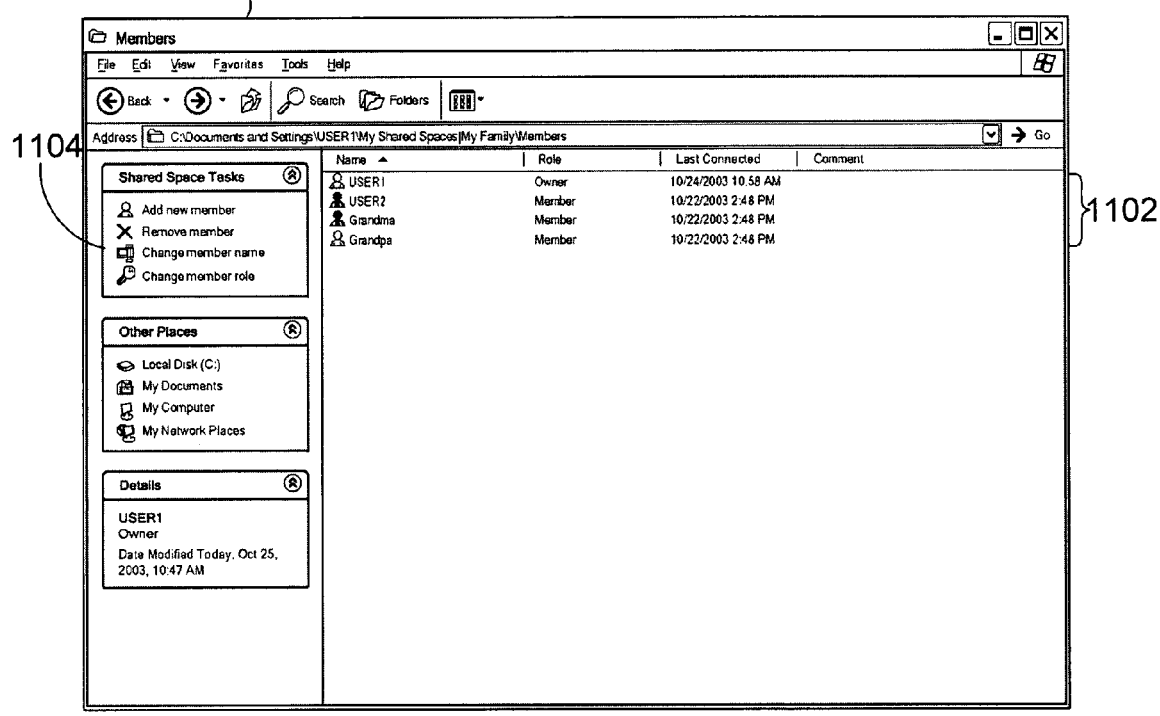
FIG. 11 is a display screen representation of a list view of a shared space folder according to an embodiment of the invention.

For performing tasks concerning group members, the Members subfolder 1002 has a designated task pane. In a preferred embodiment, when a user opens a Members subfolder 1002, a new Members window is activated. Such a Members window, in turn, is shown in FIG. 11 as window 1100. The Members window 1100 includes a list of current members 1102 of the shared space and certain attributes. The illustrated group is a "My Family Members" group comprising a group owner, USER1, and three other family group members, USER2, Grandpa and Grandma. When a group member is connected to the peer-to-peer network, the member entry in the Members list 1102 is selectable by the user. Otherwise, the entry appears grayed out in the list 1102. The members list 1102 may include fields containing the online status of the member in the shared space, the member's role and the last date in which the member connected with the group. In addition to these standard fields, the members list 1102 may further include a comment field for additional information concerning the member.

In addition to a members list 1102, the window 1100 includes a Member task pane 1104 located in the left hand pane of the window. The Member task pane 104 is used to manage the member list. For adding new members to the group, a user selectable "Add new member" task is selected. In a preferred embodiment, user selection of this task activates a wizard for adding a new member to the shared space. However, before the shared space credentials can be created, the new member's peer-to-peer credentials are obtained.

Figure 12:
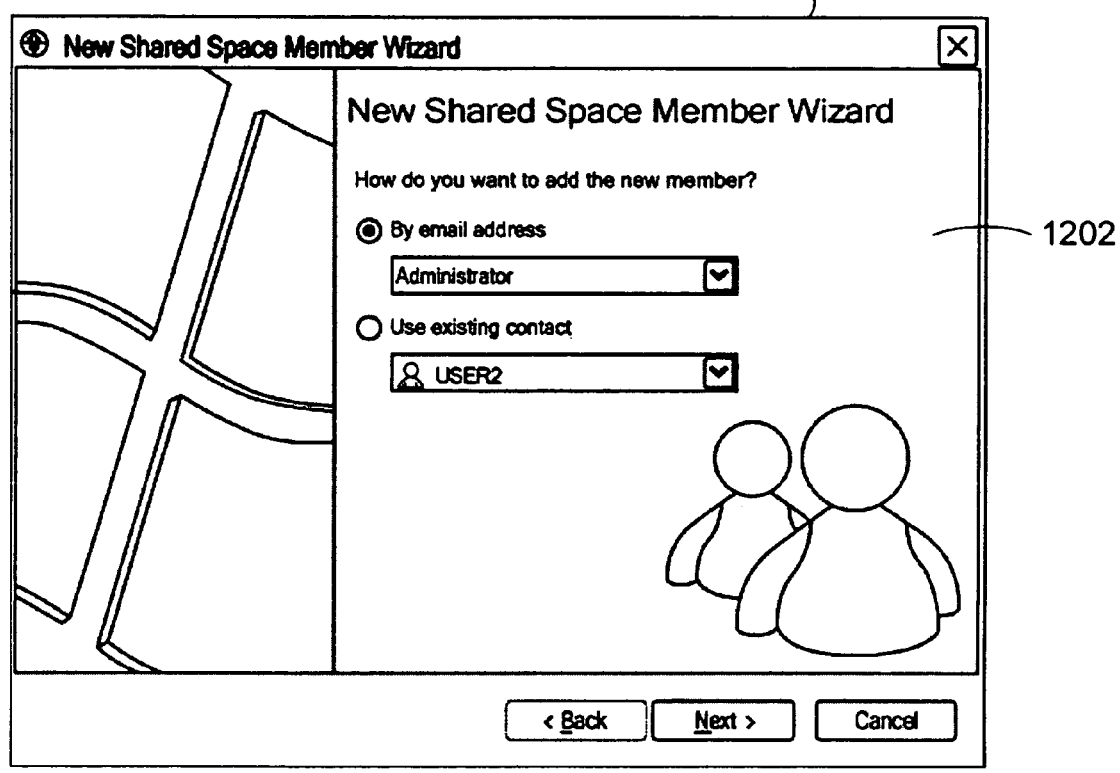
FIG. 12 is a display screen representation of a set-up wizard for creating or adding a member to a shared space according to an embodiment of the invention.
Figure 13:
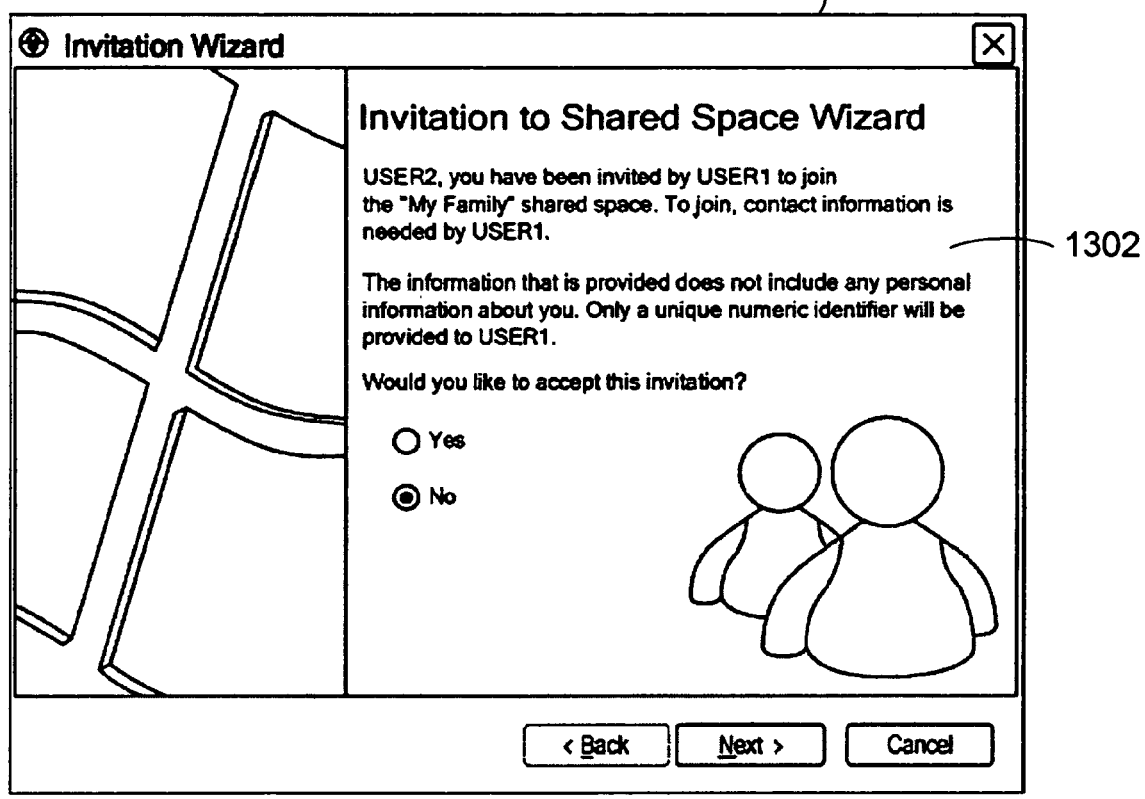
FIG. 13 is a display screen representation of an Invitation wizard displayed to a user that has been invited to join a group.
Figure 18:
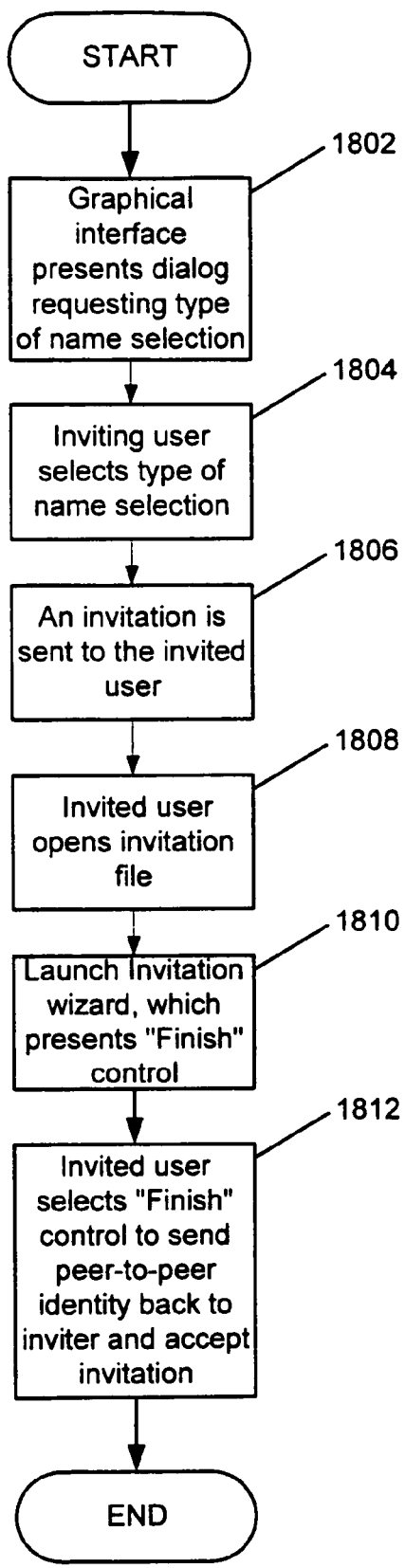
FIG. 18 is a simplified flowchart illustrating various method steps in carrying out an operation in which a new member is invited to a group.

FIGS. 12 and 13 illustrate graphical representations of the wizards for adding new members to the shared space. Although it must locate the appropriate member through operations that may be relatively complex, the wizard provides an easy-to-use mechanism from a user perspective for obtaining this data. In this regard, FIG. 18 is a simplified flow diagram that illustrates various steps performed in carrying out a method for adding new members.

For obtaining a peer-to-peer identity for the new member, a New Shared Space Member Wizard can use data obtained from an existing messenger buddy or an email address. As shown jointly in FIGS. 12 and 18, a graphical interface presents a dialog 1202 requesting the type of name selection in a first method step 1802. Next, the inviting user selects a type of name in a step 1804. In the case in which the user selects entry of an email address in the step 1804, the invited user will receive an email message providing information that the "[group owner] has invited them to join the [name of shared space] shared space. To view more information about the [name of shared space] shared space, open the attached file."

The attached file contains pure data and has been associated with an Invitation Wizard, which presents a graphical interface as shown in FIG. 13. The invited user thereafter, opens the attached invitation file in a step 1808. Opening the file will launch the Invitation Wizard in a step 1810 and allow the user to respond to a dialog 1302. In a last step 1812, the invited user sends his peer-to-peer identity back to the inviter through acceptance of the invitation such as by selecting a Finish control presented to the user. As shown the inviter only receives a unique numeric identifier associated with the invited user.

Using the peer-to-peer identity of the members, group credentials are created. An additional email may be created and sent to the user informing them that they are now the member of the shared space.

Having described the manner in which new members are added to a group, the remaining tasks available in the Members window will be described. These tasks relate to existing members of the group. For example, a user selectable "Remove member" task is rendered visible only when a member in the Members list is selected and the user is either an administrator or a group owner for the shared space. Otherwise, this task is unavailable. Selecting the "Remove member" task will remove the selected member's access to the shared space. To access the shared space at a future time, the removed member must be re-invited to join the shared space by the group owner or an administrator. In addition to removing a member, a member's name may be changed by user selection of a "Change member name" task. In a preferred embodiment, this option is only visible when a member is selected and the current user is either an administrator or the group owner for the shared space. This option may optionally be activated by right-clicking the item in the Members list and selecting a Rename option or by clicking on the name in the Members list and activating an in-place edit field.

Figure 14:
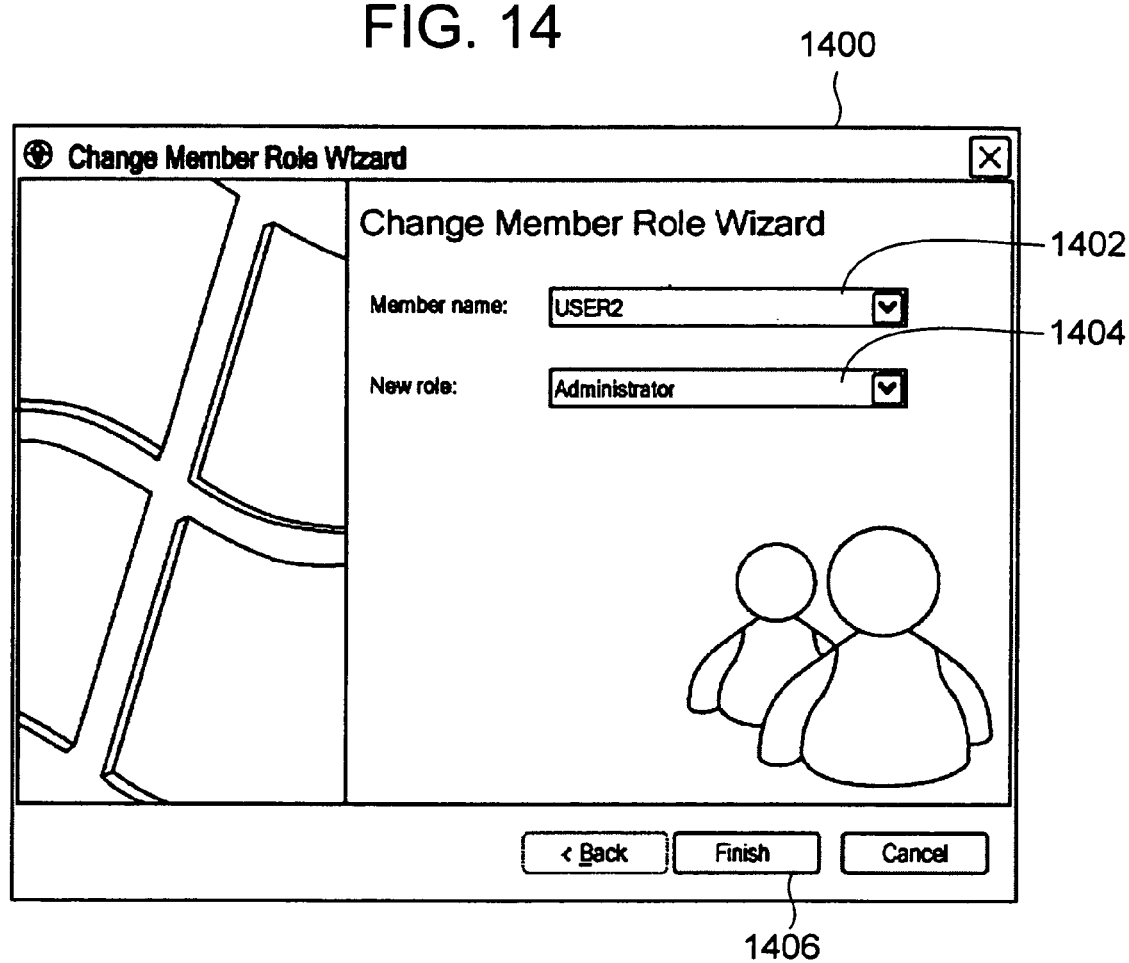
FIG. 14 is a display screen representation of a set-up wizard that enables a user with permission to change the role of a group member.
Figure 15:
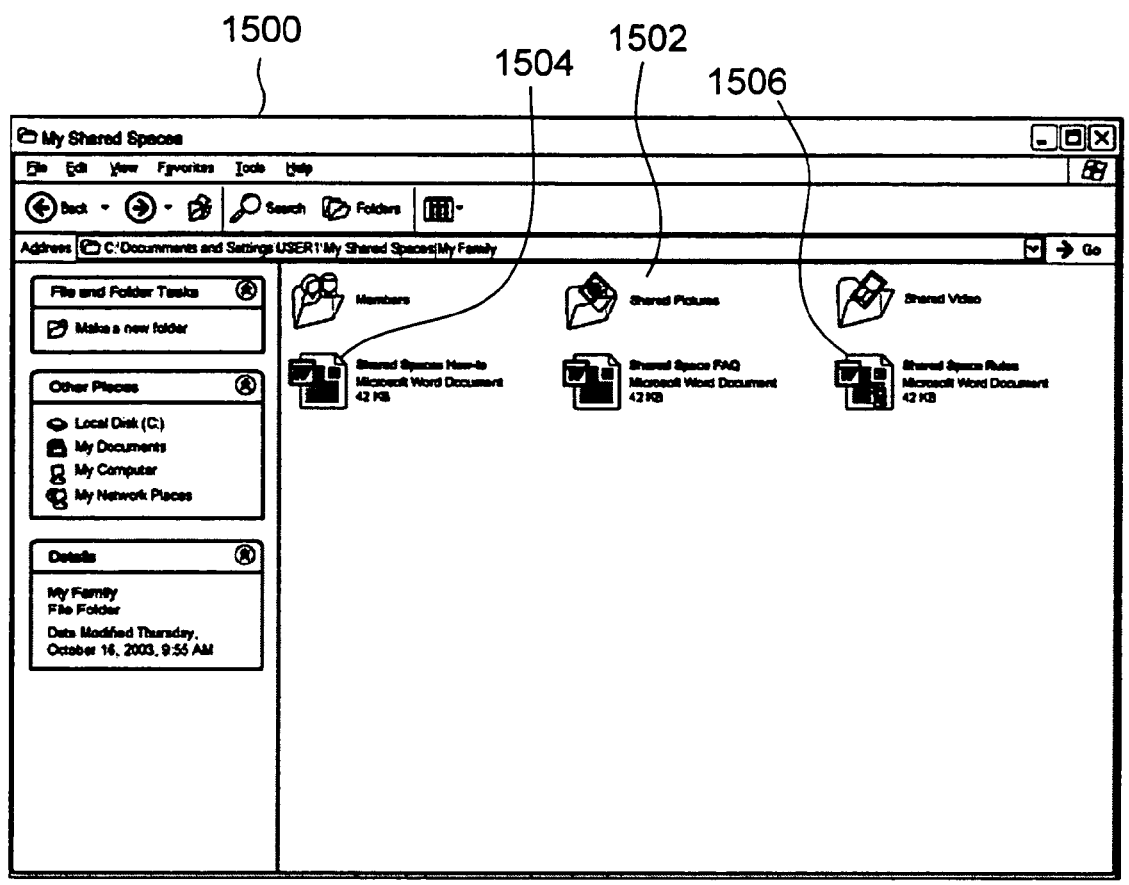
FIG. 15 is a screen display of a shared space folder illustrating various properties concerning shared files located in the shared space according to an embodiment of the invention.

A final user selectable task that is available in the Members task pane is a "Change member role" option. In a preferred embodiment, this option is visible only when a member is selected in the Members list and the current user is either an administrator or the group owner for the shared space. Otherwise, the "Change member role" option is not available. Upon user selection and activation of this option, a display interface preferably as a Change Member Role Wizard 1400 as shown in the title bar in the graphical window in FIG. 14 is presented to the user. As shown, this graphical interface includes a Member name field 1402 that may include a drop-down list of other members. In addition, the interface presents a drop-down list of potential roles in a New role field 1404. The interface further includes controls such as a Finish button 1406 for modifying the selected member's access and/or role in the group. In addition, the user may click into the role field contained in the Members list. This action will cause a combination box containing the valid roles available for the member to be presented. Selecting a role from this list will perform the same set of actions as the Change Member Role Wizard.

In accordance with another feature of the invention, files and directories contained in a shared space are accessed in a manner that is similar to the manner in which files and directories are accessed in a conventional file system. The differences impact the user experience in several ways. Because not all files exist locally unless an appropriate setting has been activated as described above, the user is informed of such "missing" files.

Figure 19:
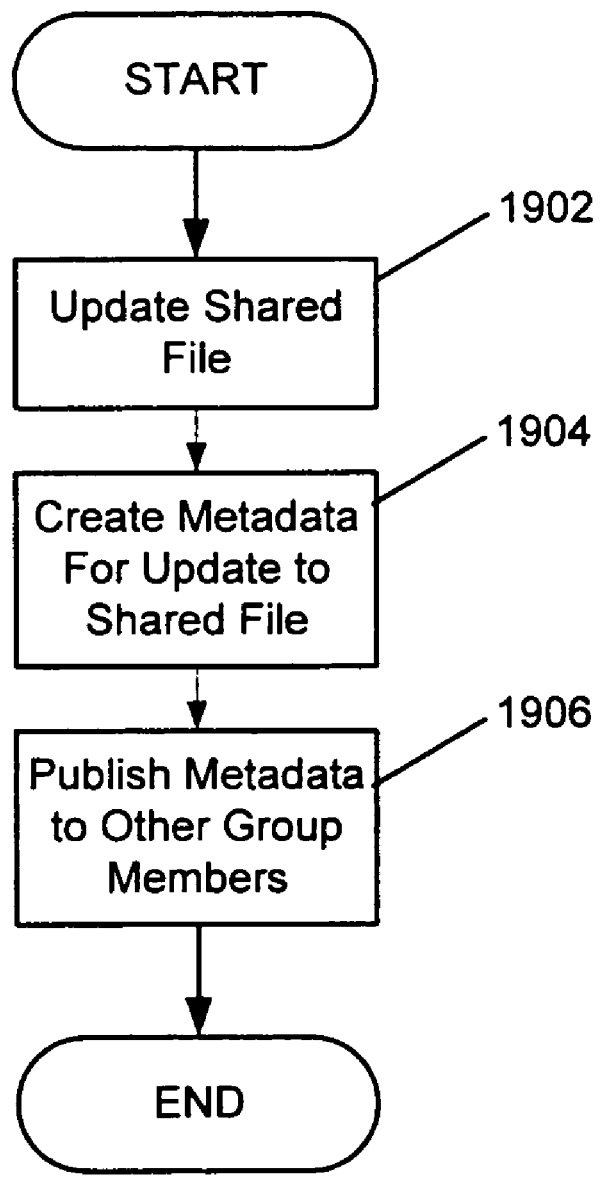
FIG. 19 is a simplified flowchart illustrating various method steps in carrying out a shared file update according to an embodiment of the invention.

For sharing files among group members, metadata is transmitted to all members when files become available, such as is shown in the steps 1904 and 1906 in the flow chart in FIG. 19. Such metadata are sufficient to render an icon of the shared file and may include date, time, thumb-nail information, name size, and optionally the source of the information. This may include an identifier for the source computing machine and the creator identity. In accordance with an embodiment of the invention, the shared content may be download from multiple sources, even though the meta-data concerning an available shared originated at a given machine. That is, shared content can be downloaded from any machine upon which the shared content resides, so it may be more efficient in some circumstances to download piecemeal from multiple peers, as those peers have obtained the shared content from the source. The manner in which a group member downloads available shared files may optionally take into account closeness in terms of IP address, least routing time, and other factors.

The following table illustrates one such implementation of required and optional metadata concerning a shared file.

```
// required
WCHAR      *m_pwzFilename; //Name of file
WCHAR      *m_pwzRealPath; //Path to file
WCHAR      *m_pwzParentId; //What the identifier for the container of
           the file is
WCHAR      *m_pwzCreatorMachineId; //on which machine the file is
           located
BOOL       m_fIsFolder; //whether the file is actually a folder
LONG       m_cbSize; // what the size of the file is
FILETIME   m_ftModification; //modification time
// optional
WCHAR      *m_pwzThumbnail; // thumbnail for the file
WCHAR      *m_pwzUrlIconFile; // URL of Icon file
```

As shown, the name and path to the file are included in the metadata of a transmitted shared file. In addition, an identifier for the container of the shared file is provided as well as the location of the machine on which the file resides. An indication of the type of file, the file size and modification date are also included. Optionally, the transmitted file may include a thumbnail and Uniform Resource Locator for the icon associated with the shared file.

To inform a user of a group shared space file that is not present locally, display icons are presented to the user. FIG.

Figure 20:
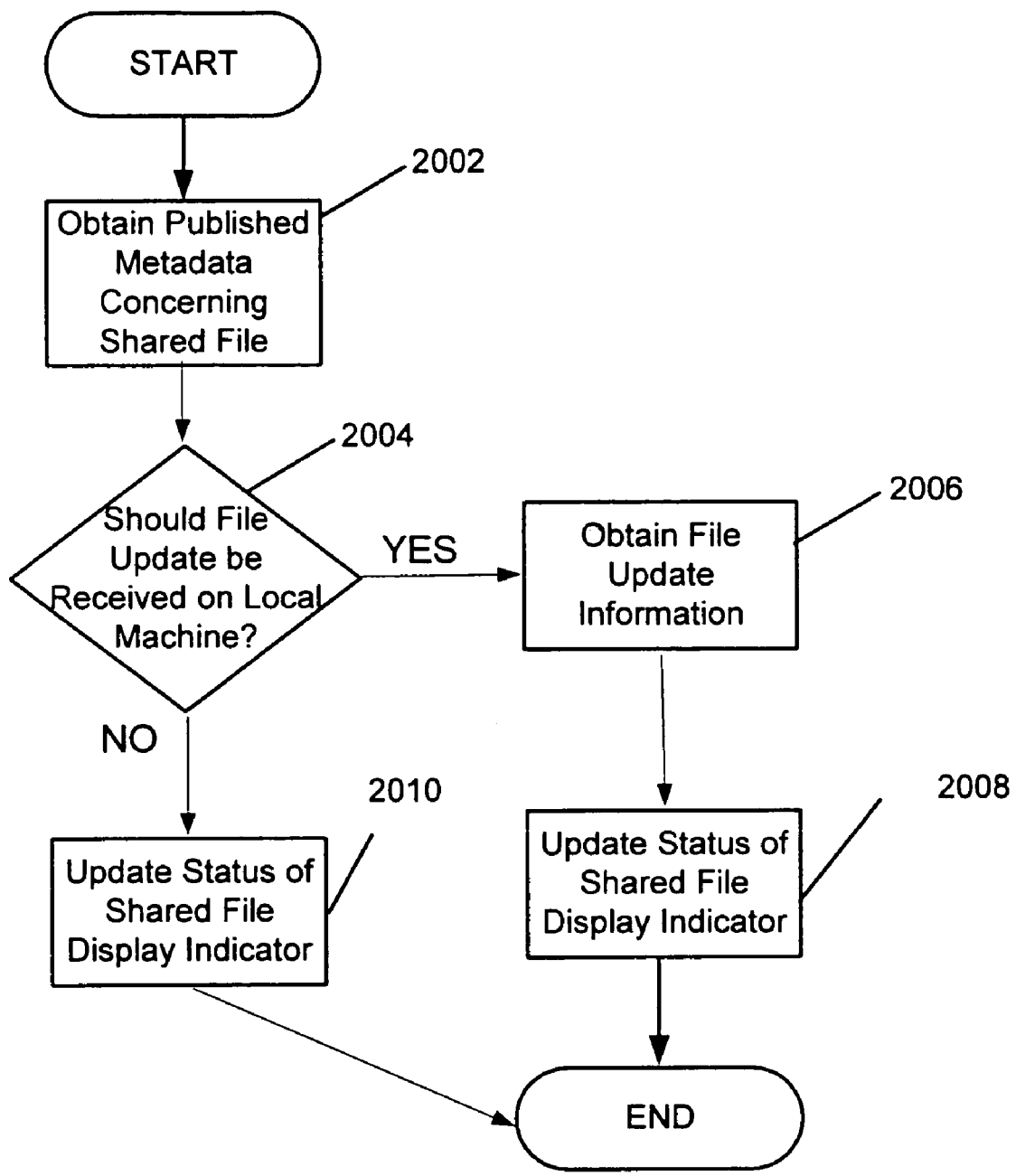
FIG. 20 is another simplified flowchart illustrating various method steps in carrying out the shared file update of FIG. 19, from the perspective of another member of a group.

15 illustrates a graphical interface 1500 for a Shared Space folder that contains files that are not local. As shown, a left hand pane 1502 presents a display icon 1504 to denote a "missing" file that is available on another system. This icon is ghosted or semi-transparent. As is shown in the flow chart in FIG. 20, the system renders such a display upon receipt that metadata concerning a shared file is available in the peer network, as is shown in method step 2002. Other files that are "missing" may be unavailable to the user, such as when a system that is hosting the file of interest is offline. In this instance, a display icon 1506 is presented as a ghosted icon that includes a small image of a red "X" or other suitable visual indicia that the file is unavailable to the user.

Additionally, because content in a group folder is likely to change over time and the organization of content does not enable the user to discern what content is new or has been recently altered, a "new" glyph may be presented on folders and files that are new or have been recently changed. This glyph provides a visual indicator of new content.

When a modification of a file contained in a shared space occurs, a notification to other members in the group occurs (see steps 1902, 1904 and 1906 in FIG. 19). In a preferred embodiment, upon receipt of such notification, member machines that have previously obtained a copy of the shared file will remove the local copy of the out-of-date file. This will change the visual representation of the file to a "missing" file within the shared space folder when the application setting does not automatically update files, as is shown in step 2010 in FIG. 20. On the other hand, if automatic replication of the shared file is enabled, the local machine obtains an updated version of the file, as is shown in step 2006 in FIG. 20. Finally, an appropriate visual indicator is presented to the user as shown in step 2008.

Figure 16:
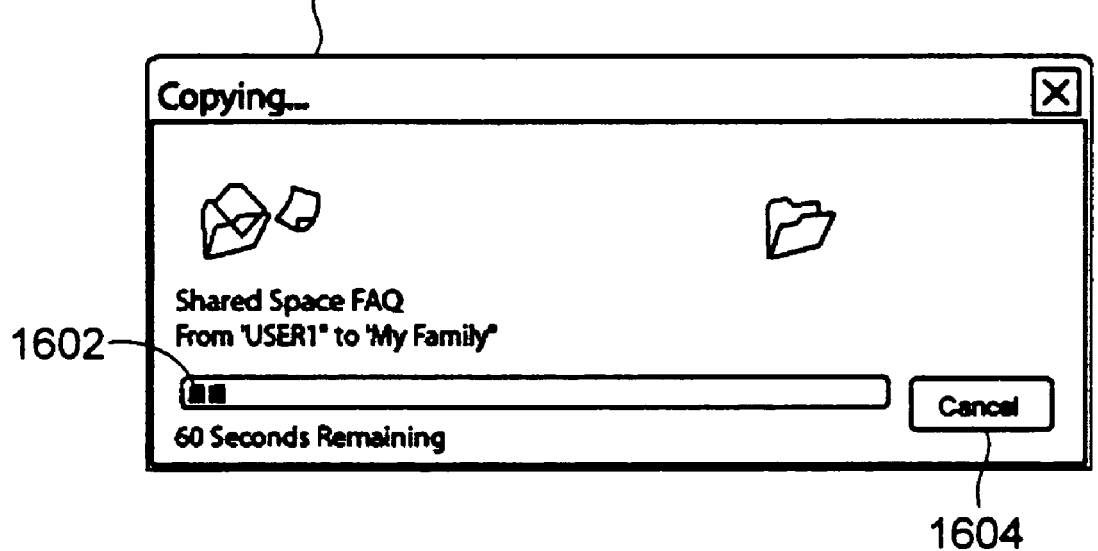
FIG. 16 is a screen display illustrating a user interface during an operation in which shared files are copied according to an embodiment of the invention.

In order for a group space member to access an updated that is not locally stored, the file must first be transmitted to the local machine. FIG. 16 illustrates a graphical interface of a file copy dialog 1600 presented to the user for indicating that a transfer operation is occurring. When the file is available on the local machine, the icon providing a shortcut to the shared file will be updated to reflect the file transfer. When the file is requested via an open dialog, the file will be opened in the requested application at the completion of the file transfer. The user is presented with a visual indication of the file transfer as shown in the graphic 1602. FIG. 16 also illustrates a Cancel control 1604 for terminating a file transfer.

Figure 17:
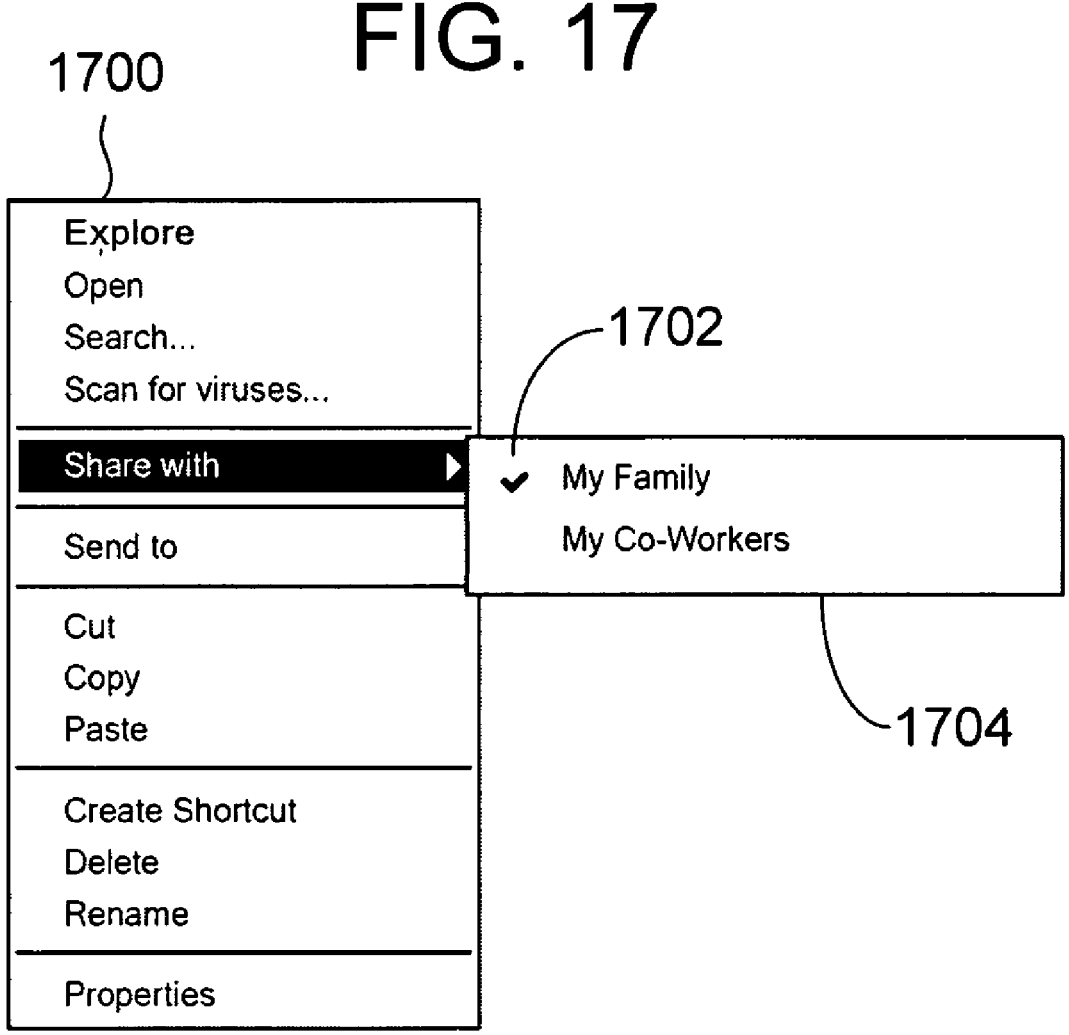
FIG. 17 illustrates a drop-down menu in accordance with a presentation display according to an embodiment of the invention.

For adding to or removing files or directories from a shared space, the user may right-click an icon associated with the content of interest to present a graphical interface, such as a Context Menu 1700 shown in FIG. 17. The Context Menu 1700 is presented with the look and feel of a file system menu having various user selectable menu options such as Explore, Open, Search and the like. In addition, the Menu includes a "Share with" menu item 1702. By user selection of this item, a drop-down list of available groups is presented. Each shared space that contains the selected file or directory will include a graphical representation such as a check mark 1704 as shown in FIG. 17. File or directory sharing of the selected item may be terminated by un-checking a shared space. Un-checking the shared space from the "Share with" menu removes the contributors' copy of the file or directory from the shared space. In the event that other group members have transferred the shared file locally, the file is preferably removed from each machine hosting the content.

In addition to using a context menu, files may also be dragged into the shared space folder from another Explorer window. Cut/Copy and Paste editing operations may also be used to transfer the file to the shared space folder. In this way, the file is copied and/or moved to the local shared space folder as indicated by the user action.

As with conventional files and directories, a shared file or directory may be readily moved by the sharing member to other locations within the shared space hierarchy. For example, the sharing member may drag a file into a different folder. Members may create new folders in the shared space for organizing content. In accordance with one feature, while any member may store content in any directory that is present in the shared space even if another member contributed to the directory, only the member who shared the content may change its location within the shared space.

In a preferred embodiment, the application maintains metric for all peers connected to the source machine. Such metric indicate response time of the peer machine, the availability of the peer machines and like data for use in the decision of how the shared data will be obtained. Thus, a download session can be suspended and resumed such that, if a portion of a shared file is downloaded and then suspended, the next time the group member is connected to the peer network or when they resume the download, the download resumes at the next place after the one that was last copied.

The invention also addresses security as share spaces transmit all shared information as encrypted. Thus, in an embodiment, a group administrator or owner supplies an enterprise policy such as group creation, how many group members are present, who can be members, such as employees of corporation X but not of corporation Y, domains, whether content can be shared. The group policy is transmitted to all the machines in the domain to which the policy pertains. The application of the invention reads and obeys such policy.

Because shared files are sometimes large files such as video files, the issue of throttling may arise. Therefore, the invention may include a user option to specify the amount of total bandwidth to be used for files downloads to other machines. Alternatively, a user might prioritize certain groups through a policy such that whenever the user is not using email or browsing, then the group space application can use the extra bandwidth to distribute files.

In some instances, the shared content may be rights protected material such as copyrighted material such that it cannot be legally copied to each of the group machines. In this case, the application may stream the content so that a copy is not created and stored on other machines belonging to group members. Instead, such other group members may listen to, watch or otherwise experience the protected content. Such action could be user driven or the application could automatically detect that certain material is digital rights management (DRM) protected. During transfer, the user can stop and start the transfer as well as observe the status of the transfer by percent delivered. The user may optionally reject a file transfer request. Because group members have credentials that describe who they are, what they can do and how they authenticate with other group members, such actions are readily implemented. As noted above, content transferred to other group members is encrypted in any event.

In this way, the invention enables interactions among group members according to real world scenarios. For example, a user may take voluminous pictures and some video of his or her children. Because sharing such content, especially the video content, is particular difficult, the user may simply create a Family shared space to use in order to exchange these and other files with his or her relatives. In another real world example, a user may schedule a meeting with several members of her business team and a few partners she has met at a tradeshow. Because she plans to share some information with other meeting participants, the user creates a group shared space for the meeting and uses the list of people "near" her to add her team members and the partners to the group. The user also may pre-populate the shared space with the presentation and other materials as desired. As attendees arrive to the meeting and power on their computing systems in preparation for the meeting, they are notified that a shared space has been created, join the shared space and access the documents. In addition, such attendees can readily add other materials concerning the meeting. When the meeting concludes, the user and or other attendees may delete the shared space or maintain it for on-going collaboration.

Various activities may occur in the group space. Such activities may include file sharing, chatting either by text and/or audio visual, gaming, white boarding, message boarding, content distribution, distribution of software and patches. Indeed, the invention may be used to perform distributed computing tasks such as, for example, working together to solve common task such as weather forecasting, complex biological problems, like mapping DNA, astronomical process analysis, or searching within group content for basic research tasks.

It will be appreciated that a novel application and interface for group interaction over a network have been described. In view of the many possible embodiments to which the principles of this invention may be applied, it should be recognized that the embodiments described herein with respect to the drawing figures are illustrative and should not be taken as limiting the scope of the invention. For example, those skilled in the art will recognize that elements of the illustrated embodiments shown in software may be implemented in hardware and vice versa or that the illustrated embodiments can be modified in arrangement and detail without departing from the spirit of the invention. For example, although the invention has been described primarily with reference to personal computers and their associated displays and desktops, it should be appreciated that the invention does not require a PC or a traditional desktop. Instead, the invention can also be implemented on other devices that support a visual display function. Therefore, the invention as described herein contemplates all such embodiments as may come within the scope of the following claims and equivalents thereof.

We claim:

1. A method for updating a shared file in a computer network including a group of communicating computing devices in a peer-to-peer network, the method comprising
performing, at a first computing device, a file system operation on a shared file associated with a first file icon corresponding to the shared file displayed in a first shared space display area to generate an updated shared file;
creating, at the first computing device, metadata associated with the updated shared file;
directly propagating, by the first computing device to a second computing device that has permission, the metadata associated with the updated shared file;
obtaining, by the second computing device, the metadata associated with the updated shared file;
determining, by the second computing device, whether the updated shared file should be replicated on the second computing device, the determining based on a file replication setting of the second computing device, the file replication setting selected by a user of the second computing device, comprising:
determining, by the second computing device, that the file replication setting indicates an on-demand basis and piecemeal downloading, by the second computing device from multiple computing devices of the group, the updated shared file; and
determining, by the second computing device, that the file replication setting indicates automatic replication and automatically piecemeal downloading, by the second computing device from the multiple computing devices of the group, the updated shared file,
wherein the multiple computing devices of the group from which the updated shared file is piecemeal downloaded are selected based on a closeness of each multiple computing device to the second computing device, the closeness based on of at least one of: IP address or least routing time;
displaying a second file icon corresponding to the shared file in a second shared space display area of the second computing device indicating that the shared file has been updated; and
displaying, by the second computing device, a third file icon corresponding to the shared file in the second shared space display area indicating that the shared file has not been updated when the updated shared file should not be replicated on the second computing device, wherein the third file icon provides an indication that an update to the shared file exists in the peer-to-peer network.

2. The method of claim 1, further comprising providing a user interface at the second computing device wherein:
the user interface includes the file replication setting, and
via the user interface, the user is enabled to select the file replication setting of the second computing device.

3. The method of claim 2, the user interface at the second computing device further comprising, a display contributor name with files setting, and via the display contributor name with files setting, the user is enabled to select whether or not a contributor name corresponding to the updated shared file is displayed with a filename of the updated shared file.

4. The method of claim 2, the user interface at the second computing device further comprising a member contributions setting, and via the member contributions setting, the user is enabled to select whether or not members of the group have permission to contribute any shared content to the group.

5. The method of claim 2, the user interface at the second computing device further comprising a new content setting, and via the new content setting, the user is enabled to select a time interval within which a given content is defined as being new.

* * * * *